United States Patent [19]

Takita

[11] Patent Number: 5,017,832
[45] Date of Patent: May 21, 1991

[54] MAGNETIC CANCELLING APPARATUS FOR COLOR CATHODE-RAY TUBE

[75] Inventor: Hidenori Takita, Nagasaki, Japan
[73] Assignee: Mitsubishi Denki Kaisha Kaisha, Tokyo, Japan
[21] Appl. No.: 426,849
[22] Filed: Oct. 26, 1989

[30] Foreign Application Priority Data

Feb. 6, 1989 [JP] Japan .................................. 1-25692

[51] Int. Cl.$^5$ ............................................. H01J 29/00
[52] U.S. Cl. ....................................... 315/8; 315/370; 313/437
[58] Field of Search .................... 315/8, 370; 313/429, 313/430, 437

[56] References Cited

FOREIGN PATENT DOCUMENTS 0039502 11/1981 European Pat. Off. .
37-3682 6/1962 Japan .
48-43219 6/1973 Japan .
54-105431 8/1979 Japan .

Primary Examiner—Robert J. Pascal
Attorney, Agent, or Firm—Burns, Doane, Swecker & Mathis

[57] ABSTRACT

A magnetic cancelling apparatus for a color cathode-ray tube which is to cancel external magnetic fields acting on the color cathode-ray tube, can prevent deterioration of the screen color purity. The apparatus includes a magnetic sensor for detecting a magnetic field in a predetermined direction acting on the cathode-ray tube. The output of the magnetic sensor is amplified and then fed to a cancelling coil, thereby permitting the screen purity to be kept in best condition even under change in direction of the external magnetic field such as the geomagnetism.

3 Claims, 4 Drawing Sheets

MAGNETIC CANCELLING APPARATUS FOR COLOR CATHODE-RAY TUBE

BACKGROUND OF THE INVENTION

1. Field of the Invention

The present invention relates to a magnetic cancelling apparatus for a color cathode-ray tube wherein external magnetic fields such as the geomagnetism acting on the color cathode-ray tube are cancelled to prevent deterioration of the color purity of the screen.

2. Description of the Prior Art

FIG. 1 is a sectional side view showing the relation between electron beams and phosphors in a color cathode-ray tube (hereinafter referred to as "CRT"). In the same figure, the numeral 1 denotes a display panel of the CRT; numeral 2 denotes a phosphor coated on the back of the panel 1; numeral 3 denotes a shadow mask disposed closely behind the panel 1; numeral 4 denotes a small hole formed in the shadow mask 3; and numeral 5 denotes an electron beam which impinges upon the phosphor 2 through the small hole 4.

FIG. 2 is a perspective view showing external magnetic fields acting on a display unit provided with a CRT. In the same figure, the numeral 6 denotes a display unit; numeral 7 denotes a housing of the display unit; numeral 8 denotes a vertical magnetic field acting vertically on the display unit 6; numeral 9 denotes a horizontal magnetic field acting horizontally on the display unit 6; and numeral 10 denotes an axial magnetic field acting on the display unit 6 in the direction of the axis of the CRT.

The operation will now be described. Electron beams 5 emitted from electron guns (not shown) of, for example, red, green and blue pass through small holes 4 of the shadow mask 3 and impinge upon phosphors 2 of the respective corresponding colors. Consequently, the phosphors 2 emit light to make a predetermined color image display. Where external magnetic fields such as the geomagnetism are not exerted on the display unit 6, that is, where the vertical, horizontal and axial magnetic fields 8, 9, 10 are all zero, the electron beams are in the state of just landing wherein the center of each phosphor 2 and that of each electron beam 5 are coincident with each other, as shown in FIG. 3.

When external magnetic fields such as the geomagnetism act on the display unit 6, the paths of the electron beams 5 are bent, so that the just landing state is not maintained and there occurs mislanding, as shown in FIG. 4. More particularly, as shown in FIG. 4(A), under the influence of the vertical magnetic field 8 passing from above to below, the electron beams 5 as a whole are shifted to the left in the figure with respect to the phosphors 2 on the screen of the panel 1. Moreover, under the influence of the horizontal magnetic field 9 passing from the left to the right, the electron beams 5 as a whole are shifted downwards with respect to the phosphors 2, as shown in FIG. 4(B). Further, under the influence of the axial magnetic field 10 passing from the panel 1 side toward the electron guns, the electron beams 5 are shifted clockwise with respect to the phosphors 2 on the panel 1, as shown in FIG. 4(C). Such mislandings cause deterioration in the color purity of the screen.

As a magnetic cancelling apparatus for preventing such mislandings of the electron beams 5 relative to the phosphors 2 caused by external magnetic fields, there has heretofore been known an apparatus wherein an internal magnetic shield formed of a magnetic material is provided in the interior of a CRT. Also known is a geomagnetism cancelling apparatus which is disclosed in the Technical Reports of the Institute of Television Engineers of Japan, ED913 IPD101-16, Nov. 15, 1986. In this known geomagnetism cancelling apparatus, a cancelling coil is mounted to a CRT, and by passing an electric current in the cancelling coil there is generated a magnetic field in a direction of cancelling the geomagnetism.

In the conventional magnetic cancelling apparatus for a CRT of the above construction provided with the internal magnetic shield, it is impossible to obtain a satisfactory magnetic cancelling effect. Particularly, under the action of the axial magnetic field 10, there occurs a so-called clipping phenomenon in which, for example, an electron beam 5 which should impinge upon a green phosphor 2 impinges upon an adjacent red or blue phosphor 2. This phenomenon is apt to occur in a CRT having small gun separation. To avoid such clipping, the area, or the diameter, of each phosphor 2 is made smaller at the marginal portions than at the central portions of the screen. In this case, however, there occurs a difference in luminance between the central portions and the marginal portions of the screen, resulting in that the marginal portion becomes dark.

In the conventional geomagnetism cancelling apparatus also referred to above, when the panel 1 of the CRT is moved in a specific direction, the current in the cancelling coil is adjusted manually to obtain the best purity. Therefore, if the display unit 6 is changed its direction, the purity will be deteriorated. So at every such change it is necessary to make manual adjustment, which is inconvenient.

SUMMARY OF THE INVENTION

The present invention has been accomplished for solving the above-mentioned problems. It is an object thereof to provide a magnetic cancelling apparatus for a CRT wherein the central and marginal portions of the screen are not different in brightness and the landing state of electron beams does not change even upon change in an external magnetic field such as the geomagnetism when a display unit is changed its direction.

In the magnetic cancelling apparatus for a CRT according to the present invention, a magnetic sensor for detecting a magnetic field in a predetermined direction acting on the CRT is provided and the output thereof is amplified and then fed to a cancelling coil. More specifically, in the CRT magnetic cancelling apparatus according to the present invention, an electric current of a magnitude corresponding to an external magnetic field in a predetermined direction acting on the CRT flows in the cancelling coil on the basis of the output of the magnetic sensor, whereby there is generated a magnetic field which cancels the above external magnetic field. Therefore, even if the external magnetic field changes, the magnetic field acting on the CRT is kept zero and so there will not occur any change in the landing of electron beams.

The above and other objects and novel features of the present invention will appear more fully from the following detailed description when the same is read in connection with the accompanying drawings. It is to be understood, however, that the drawings are for the purpose of illustration only and are not intended to limit the scope of the present invention.

DETAILED DESCRIPTION OF THE PREFERRED EMBODIMENTS

An embodiment of the present invention will be described below with reference to the drawings.

Figure 2:
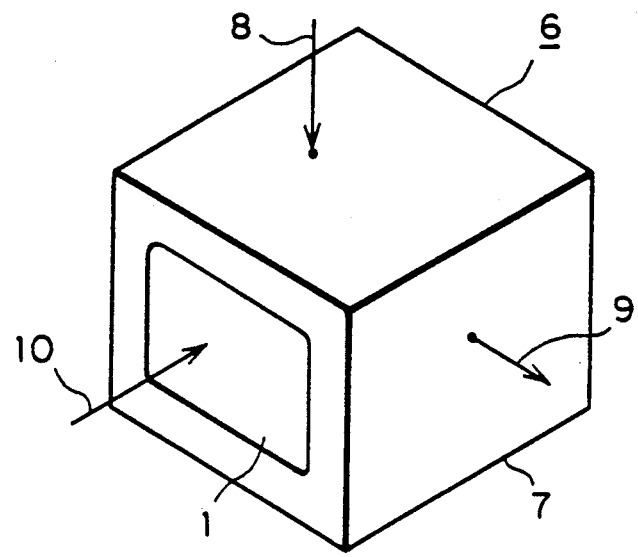
FIG. 2 is a perspective view for the explanation of external magnetic fields acting on a display unit provided with a CRT.
Figure 1:
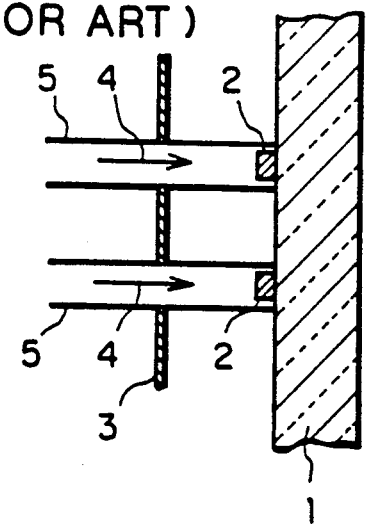
FIG. 1 is a sectional side view of a principal portion, showing a relationship between electron beams and phosphors in a CRT.
Figure 3:
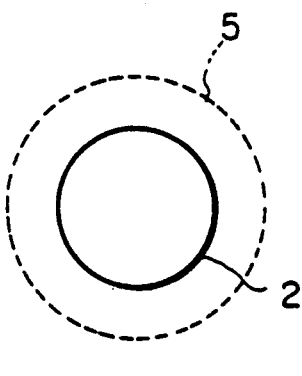
FIG. 3 is a schematic plan view showing a just landing state of an electron beam.
Figure 4A:
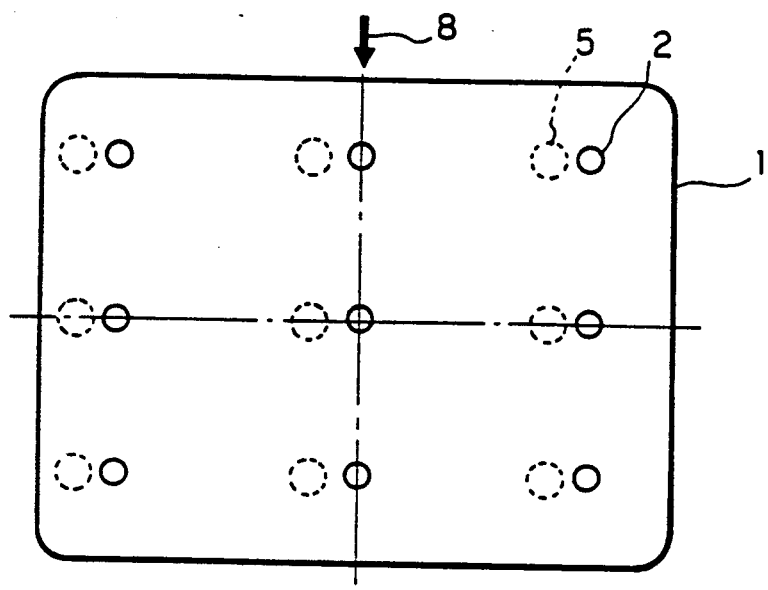
FIG. 4 is a front view for the explanation of mislanding.
Figure 4B:
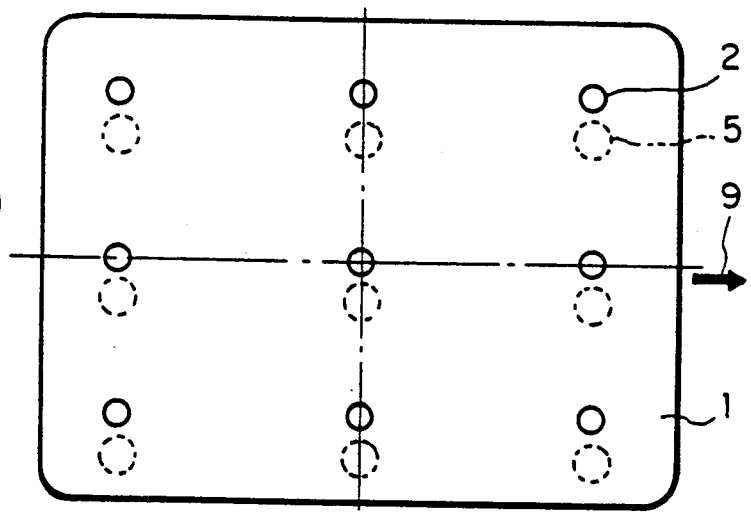
Figure 4C:
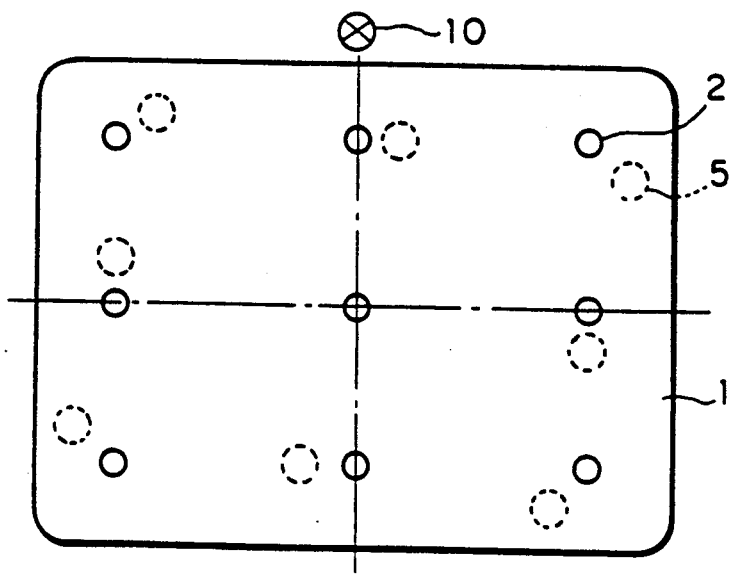
Figure 5:
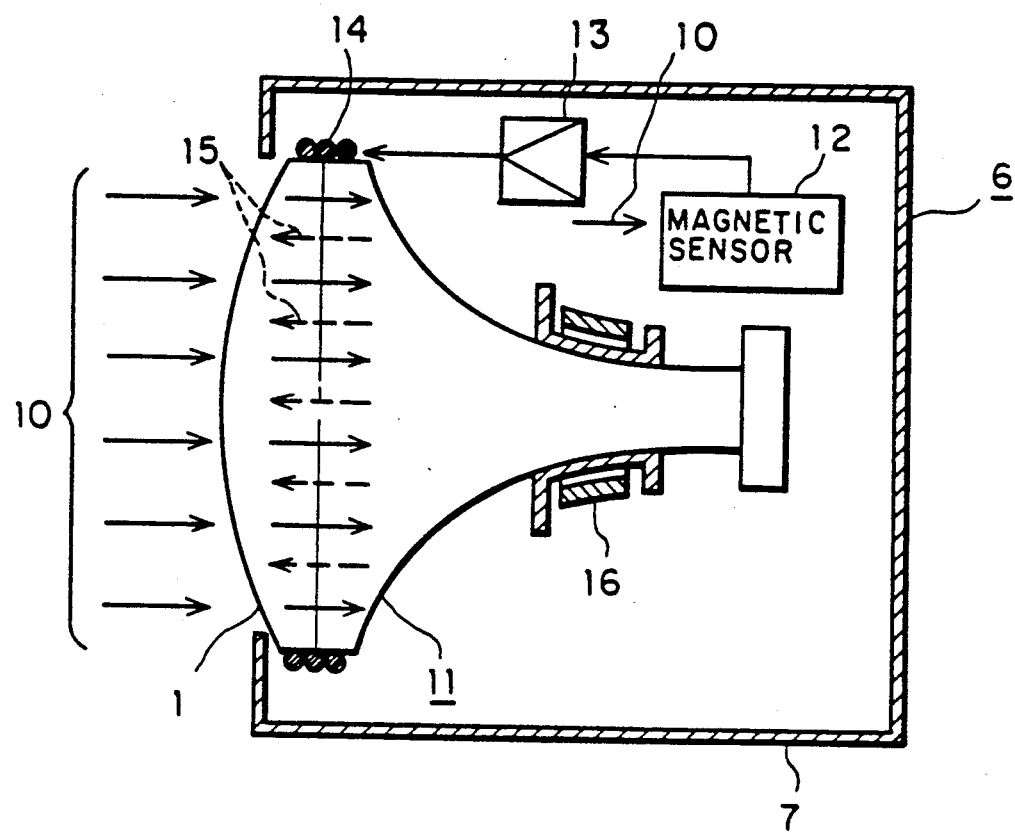
FIG. 5 is a sectional side view showing a magnetic cancelling apparatus for a CRT according to an embodiment of the present invention.

In FIG. 5, the portions common to FIGS. 1 and 2 are indicated by the same reference numerals and will not be explained here. The numeral 11 denotes a CRT disposed within a housing 7 of a display unit 6. The CRT 11 has the foregoing panel 1. Numeral 12 denotes a magnetic sensor, which is disposed in the housing 7 or in any other appropriate place to detect an axial magnetic field 10 passing from the panel 1 of the CRT 11 toward the electron gun (not shown). Numeral 13 denotes an amplifier for amplifying an output signal provided from the magnetic sensor 12, and numeral 14 denotes a cancelling coil which is energized by the output signal from the amplifier 13. The cancelling coil 14 is wound round the peripheral surface portion of the panel 1. Numeral 15 denotes a cancelling magnetic field generated in a direction of cancelling the axial magnetic field 10 by the coil current flowing in the cancelling coil 14, and numeral 16 denotes a deflecting yoke mounted on the neck portion of the CRT 11. The magnetic sensor 12 is disposed at a position sufficiently remote from the cancelling coil 14 so as not to be influenced by the cancelling magnetic field 15.

Figure 6:
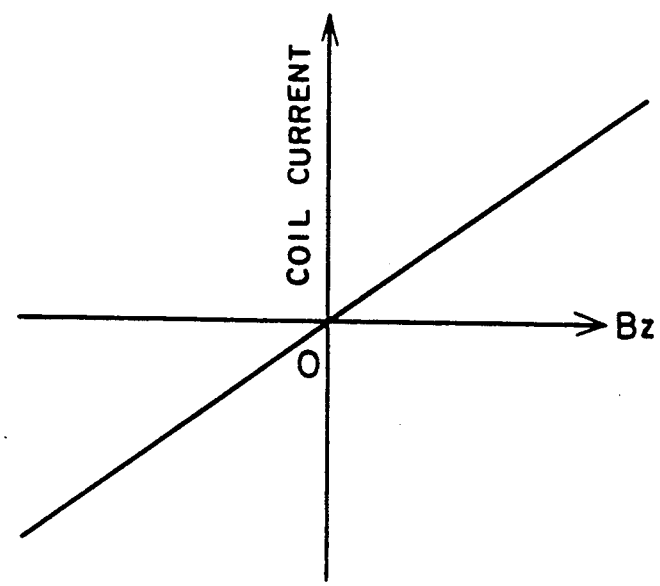
FIG. 6 is a characteristic diagram showing the relationship between the geomagnetism and coil current in the said apparatus.

FIG. 6 is a characteristic diagram showing a coil current flowing in the cancelling coil 14 vs. the geomagnetism Bz, assuming the axial magnetic field 10 to be the geomagnetism Bz.

The operation of this embodiment will now be described. When the axial magnetic field 10 based on the geomagnetism Bz acts on the CRT 11, the magnetic sensor 12 detects the axial magnetic field 10 and provides an output signal proportional to the magnitude of the magnetic field to the amplifier 13. Then, the output signal amplified at a predetermined gain by the amplifier 13 is fed to the cancelling coil 14, so that an electric current flows in the cancelling coil 14 to generate a cancelling magnetic field 15, which cancels the axial magnetic field 10. As a result, the internal magnetic field of the CRT 11 becomes substantially zero. The gain of the amplifier 13 is selected so that in the cancelling coil 14 there flows an electric current of a magnitude cancelling the said internal magnetic field into substantially zero in accordance to the output signal of the magnetic sensor 12.

Even if the geomagnetism Bz or the axial magnetic field 10 varies when the display unit 6 is changed its direction, the internal magnetic field of the CRT 11 can be kept substantially zero because the coil current varies in proportion to the geomagnetism Bz as shown in FIG. 6, and thus there will be no change in the landing of electron beams.

Although in the above embodiment the cancelling coil 14 is wound annularly round the panel of the CRT 11, it may be mounted to another portion, for example, on the circumference of a panel-side separator of the deflecting yoke 16. Also in this case there can be attained the same effect as in the above embodiment.

Figure 7:
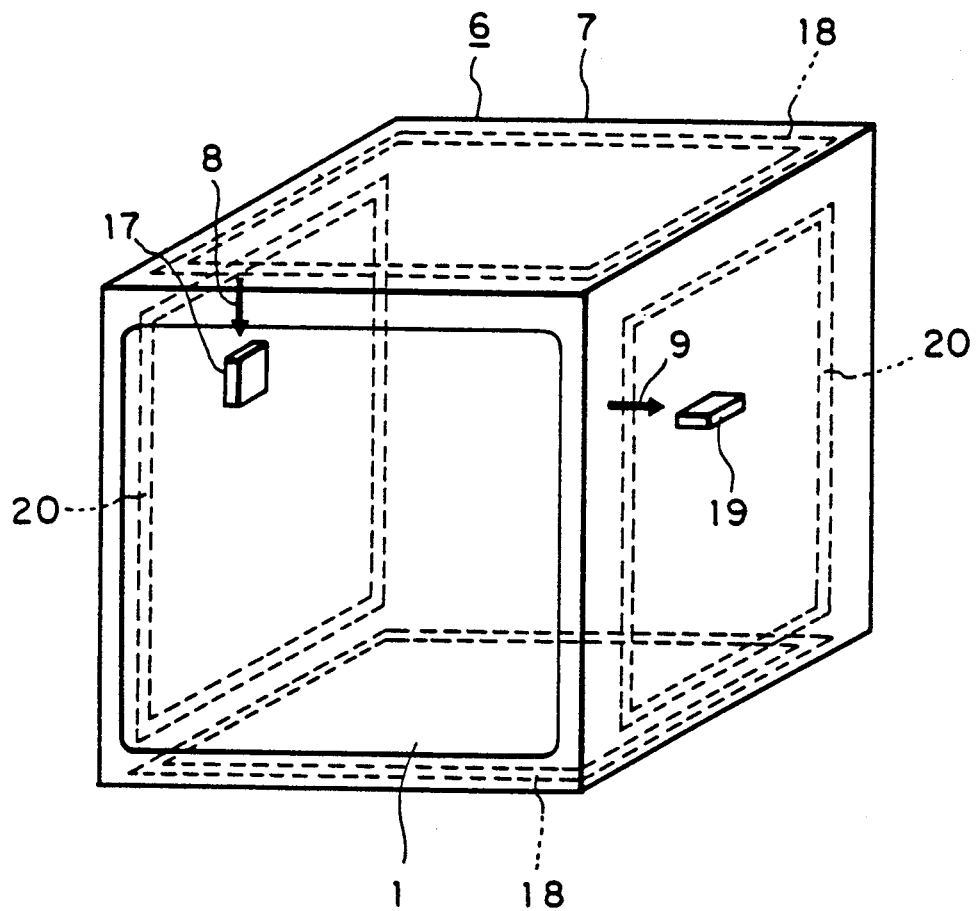
FIG. 7 is a perspective view showing a magnetic cancelling apparatus for a CRT according to another embodiment of the present invention.

Further, although the above embodiment is of the case where the axial magnetic field 10 which exerts the greatest influence on purity acts on the CRT 11, the apparatus can be constructed to cancel the vertical and horizontal magnetic fields 8, 9 as shown in FIG. 7.

In FIG. 7, a magnetic sensor 17 for detecting the vertical magnetic field 8 is attached to the left side face in the interior of the housing 7, and a cancelling coil 18 for generating a cancelling magnetic field to cancel the vertical magnetic field 8 is provided in both the top and bottom surfaces of the housing 7.

Moreover, a magnetic sensor 19 for detecting the horizontal magnetic field 9 is attached to the right side face in the interior of the housing 7, and a cancelling coil 20 for creating a cancelling magnetic field to cancel the horizontal magnetic field 9 is mounted in both the right and left side faces of the housing 7.

Also provided are amplifiers (not shown) for amplifying the output signals of the magnetic sensors 17, 19 and supplying them to the cancelling coils 18, 20.

As the magnetic sensors 12, 17 and 19 those ranging from 0 to 1.0 gausses are preferred. A practical example is described in "The Development of a Field Magnetometer", Mitsubishi Denki Giho: Vol. 61, No. 8, 1987.

Although the mislanding caused by the geomagnetism was explained in the above embodiments, the same effects as above can be attained also against other magnetic fields than the geomagnetism such as, for example, leakage magnetic fields of a transformer or magnetic fields generated from such machines as trains and motors.

As set forth hereinabove, since the present invention is constructed so that the magnetic field in a predetermined direction is detected by a magnetic sensor and then a cancelling coil is energized in accordance with the result of the detection, the internal magnetic field of a CRT can be kept substantially zero even upon change in direction of an external magnetic field such as the geomagnetism when a display unit provided with the CRT is changed its direction. Consequently, the positional relationship between electron beams and phosphors can always be maintained in designed conditions, thus permitting the screen purity to be kept in best condition.

What is claimed is:

1. A magnetic cancelling apparatus for a color cathode-ray tube, comprising:
    a magnetic sensor for detecting an external magnetic field acting on said color cathode-ray tube in a direction parallel to the axis of said tube;
    an amplifier for amplifying an output signal provided from said magnetic sensor; and a cancelling coil wound annularly around the periphery of said tube and energized by an output signal from said amplifier for generating a magnetic field cancelling said external magnetic field.

2. A magnetic cancelling apparatus for a color cathode-ray tube according to claim 1, wherein said cancelling coil is wound annularly around the periphery of a panel portion of said tube for generating said magnetic field cancelling said external magnetic field.

3. A magnetic cancelling apparatus for a color cathode-ray tube according to claim 1, wherein said cancelling coil is provided on the circumference of a panel-side separator of a deflecting yoke of said tube for generating said magnetic field cancelling said external field.

* * * * *